(12) United States Patent
Goetzke et al.

(10) Patent No.: US 9,641,770 B2
(45) Date of Patent: May 2, 2017

(54) ALGORITHM AND DEVICES FOR CALIBRATION AND ACCURACY OF OVERLAID IMAGE DATA

(71) Applicant: WASAKA LLC, New York, NY (US)

(72) Inventors: Biagio William Goetzke, New York, NY (US); Gregory Aaron Kohanim, New York, NY (US)

(73) Assignee: Wasaka LLC, New York, NY (US)

( * ) Notice: Subject to any disclaimer, the term of this patent is extended or adjusted under 35 U.S.C. 154(b) by 138 days.

(21) Appl. No.: 14/743,963

(22) Filed: Jun. 18, 2015

(65) Prior Publication Data
US 2016/0373657 A1    Dec. 22, 2016

(51) Int. Cl.
| | | |
|---|---|---|
| H04N 5/222 | (2006.01) | |
| H04N 5/228 | (2006.01) | |
| H04N 5/265 | (2006.01) | |
| H04N 5/232 | (2006.01) | |
| G06F 17/30 | (2006.01) | |
| G06N 7/00 | (2006.01) | |

(52) U.S. Cl.
CPC ....... H04N 5/265 (2013.01); G06F 17/30268 (2013.01); G06N 7/005 (2013.01); H04N 5/23293 (2013.01)

(58) Field of Classification Search
CPC .............. G01C 21/005; G01C 21/3602; G01C 21/3647; G06T 19/006; G06K 9/00664; H04N 1/00204; H04N 1/00244; H04N 1/32101; H04N 21/25841; H04N 21/4312; H04N 21/4314; H04N 2201/3253; H04N 2201/3273

USPC .................................. 348/333.01–333.13
See application file for complete search history.

(56) References Cited

U.S. PATENT DOCUMENTS

| | | | | |
|---|---|---|---|---|
| 2005/0107952 | A1* | 5/2005 | Hoshino | G08G 1/0969 701/431 |
| 2006/0195858 | A1* | 8/2006 | Takahashi | G01C 21/3602 725/19 |
| 2007/0276590 | A1* | 11/2007 | Leonard | G01C 21/005 701/468 |
| 2010/0149399 | A1* | 6/2010 | Mukai | G01C 21/20 348/333.02 |
| 2012/0071277 | A1* | 3/2012 | Denton | A63B 57/00 473/407 |
| 2014/0247279 | A1* | 9/2014 | Nicholas | G06F 3/011 345/633 |

(Continued)

*Primary Examiner* — Chia-Wei A Chen

(57) ABSTRACT

The algorithm of the present disclosure works in conjunction with a user device (e.g., a mobile phone) capable of acquiring and displaying an image, and a server. First and second portions of the algorithm can be resident on the user device and the server, respectively. The algorithm can receive the image, as well as other information from the device such as the location and compass heading of the device, and time of day. The algorithm can obtain information relating to an object in the image, and display the data set on or near the object in the image. The data set can contain information relevant to or about the object. The algorithm can automatically detect whether the data set is in the right location, and if not, calculate and apply an offset to the data set. The algorithm can also store data from multiple users and analyze this data over a period of time to determine the accuracy of the same.

16 Claims, 18 Drawing Sheets

(56) References Cited

U.S. PATENT DOCUMENTS

| | | | |
|---|---|---|---|
| 2015/0049001 A1* | 2/2015 | Rahman | G02B 27/017 345/8 |
| 2015/0062114 A1* | 3/2015 | Ofstad | G06T 19/006 345/419 |

* cited by examiner

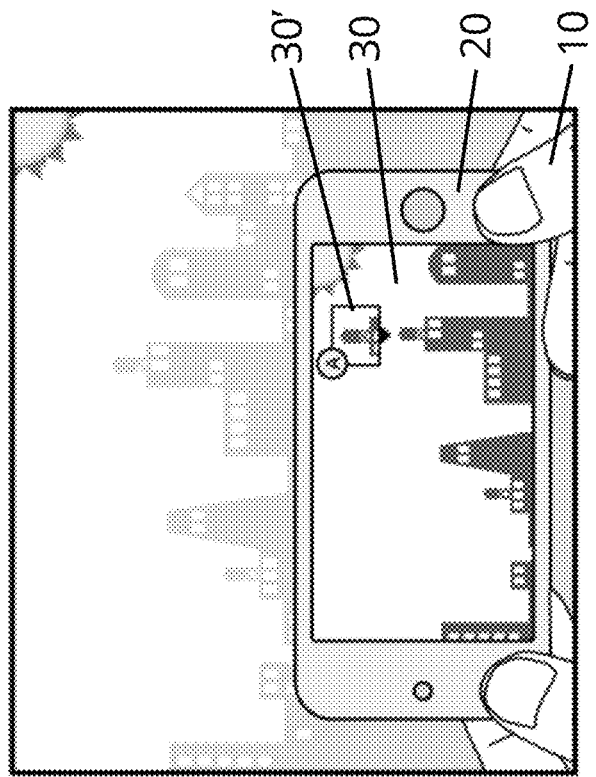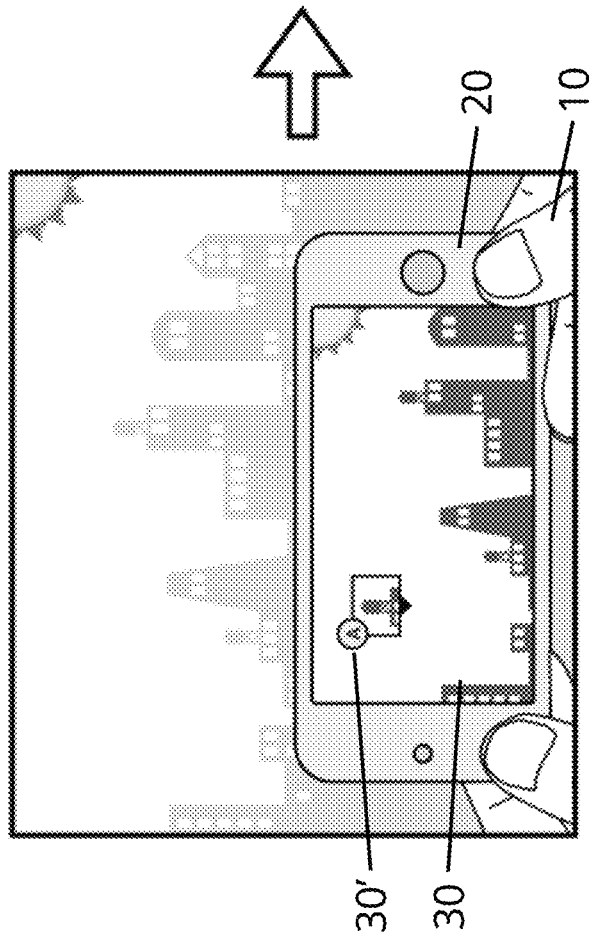

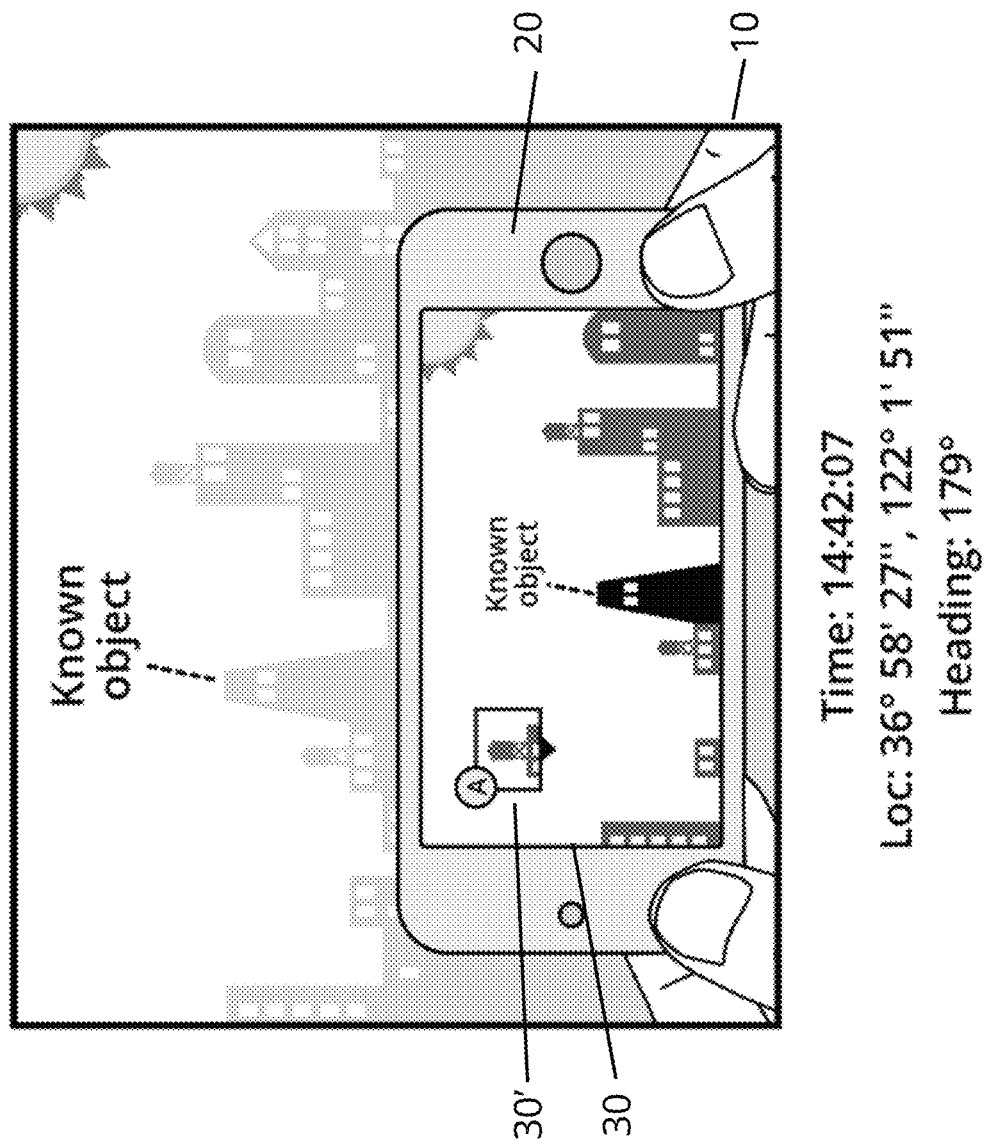

and communication port; a server, wherein the server communicates with said the device via the communication port; and an algorithm comprising a first portion and a second portion, wherein the first portion is resident on the user device and the second portion is resident on the server. The

ALGORITHM AND DEVICES FOR CALIBRATION AND ACCURACY OF OVERLAID IMAGE DATA

BACKGROUND OF THE DISCLOSURE

1. Field of the Disclosure

The present invention relates generally to algorithms, devices and methods for improving the accuracy of sensor data in electronic devices through various embedded, application and cloud-based solutions. In particular, the present disclosure provides an algorithm and associated devices that provide better and more reliable representation of perspective, location, direction, overlaying of content, and spatial relationships for devices.

2. Description of the Related Art

It is known that the accuracy of individual sensors and associated data in a mobile device are prone to inaccuracies. So much so, in fact, that enabling valuable user experiences based on this sensor data can frequently be difficult if not impossible. For example, it might be possible to gain access to adequate sensor data to determine a specific user's device location from GPS, and also accurately determine the precise time, but based on environmental or other conditions, it's difficult to accurately determine the orientation and perspective of a user's device.

As a result, for location based applications that rely on directional accuracy, perspective or other heading and angle-dependent solutions are prone to inaccuracy often providing a poor user experience, particularly with content being overlaid against a real-time image and as a result, incorrect information can be provided to the user about their surroundings.

While it is possible for some of the sensors in mobile devices to be calibrated, every sensor is somewhat different and therefore, it becomes the responsibility of the user, the application or the developer to implement workarounds that account for and resolve these inaccuracies for any particular device to enable an accurate output or augmented output through an offset calculation.

SUMMARY OF THE DISCLOSURE

In order to improve the accuracy of a network of community sensors, this invention provides for individual calibration and offset solutions. Additionally, it provides a cloud-based or service-based solution that will ingest individual sensor data from each device and associated sensor, along with the user calibration offset data. With the service or cloud-based algorithm of the present disclosure better accuracy is provided across all attached devices and sensors. While all of the calibration and sensor offset parameters can be stored directly on the device and made available to an application or operating system, one of the main advantages of this invention is that it enables the individual device, sensor and offset data to be shared and stored centrally, processed and shared across all devices and related sensors in near real time.

Thus, in one embodiment, the present disclosure provides a system for acquiring an image and overlaying a data set on the image. The system comprises: a user device, the user device comprising an image acquisition sensor, a display, and communication port; a server, wherein the server communicates with said the device via the communication port; and an algorithm comprising a first portion and a second portion, wherein the first portion is resident on the user device and the second portion is resident on the server. The image acquisition sensor acquires the image and displays it on the display. The algorithm acquires the image from the image acquisition sensor, determines the nature of an object in the image, and supplies the data set at a location in the display, wherein the data set contains information relating to the object. The data set comprises information pertaining to the object in the image. The algorithm determines if the location of the data set aligns with the location of the object, and if not, automatically calculates and applies an offset to the data set, so that the data set aligns with the object in said image.

BRIEF DESCRIPTION OF THE DRAWINGS

FIGS. 1-3b are schematic drawings depicting a first application for an algorithm of the present disclosure.

FIGS. 4-5b are schematic drawings depicting a second application for an algorithm of the present disclosure.

DETAILED DESCRIPTION OF THE DISCLOSURE

Referring to the Figures, and in particular FIGS. 1-8, a first embodiment of the present disclosure is shown. As discussed in greater detail below, the algorithm 100 of the present disclosure can acquire and manipulate data provided by a user device, and provide an augmented image, tool, or data set to the device. As discussed in greater detail below, algorithm 100 can reside locally on device 20. Algorithm 100 may also instead remotely in a cloud or server. Algorithm 100 may also perform functions both on device 20, and remotely on the cloud or server.

Figure 1:
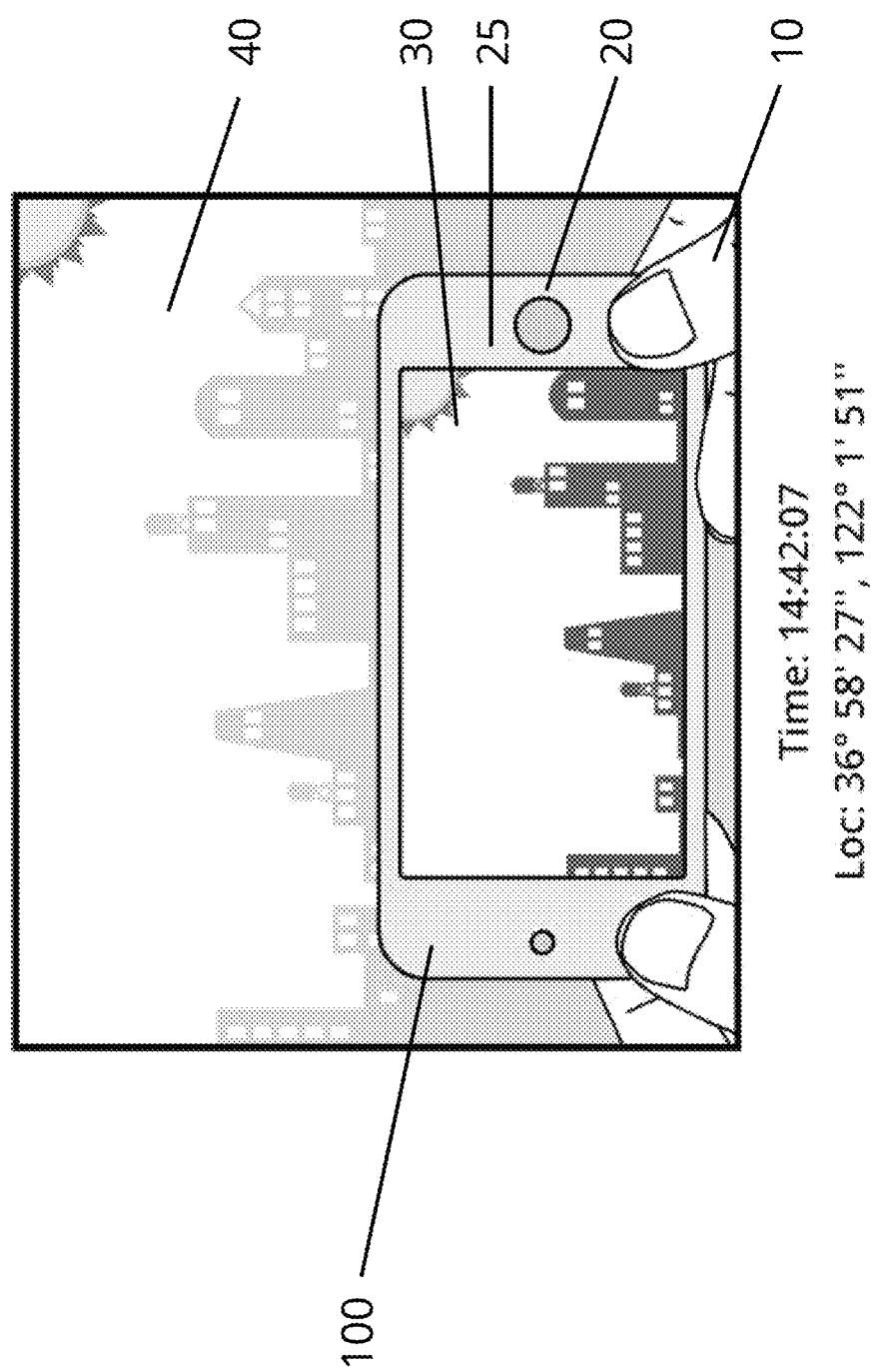

As shown in FIG. 1, a user 10 can hold their device 20 up to a scene 40. An image acquisition device or camera (not shown) within device 20 acquires a continuously updating real time image 30 on display 25. Based on certain data acquired by device 20 (e.g., time of day, location), algorithm 100 will provide an overlay or data set 30' to device 20. Algorithm 20 can acquire data set 30' via databases of information, through feedback provided by one or more users 10, or both. Advantageously, in the manner described in greater detail below, algorithm 100 of the present disclosure then determines whether data set 30' is correctly located when overlaid onto image 30—i.e., whether data set 30' is correctly aligned with the corresponding feature or object in image 30. If not, algorithm 100 calculates the needed offsets, and displays data set 30' in the correct location (FIG. 3b).

Accordingly, algorithm 100 of the present disclosure is highly advanced as compared to currently available algorithms, and provides a greatly enhanced experience for user 10. Some currently available devices and programs may have the general ability to find a user's location and overlay an image on their device, but they are not able to determine the user's orientation, make adjustments to the image, or make any other enhancements that will improve the user's experience. With currently available devices and methods, users are left with poorly fitting images, and cannot easily determine where the information provided matches the image on their device. Algorithm 100 of the present disclosure addresses these disadvantages.

Turning again to the Figures, as previously discussed the user 10 would point their device 20 in a given direction (FIG. 1). A camera on the device would acquire and output image 30 to display 25. Algorithm 100 receives data from device 20, and acquires a suitable overlay image. The data that algorithm 100 acquires from device 20 could include, but is not limited to, a time, location, camera sensor data, a horizon, one or more points of interest, or a real time camera image, all of which could be displayed on a device's display 25, or other I/O device. Based on the data acquired by device 20, algorithm 100 can further acquire additional relevant information, such as a map, points of interest, or other information associated therewith. This information, as discussed above, can be acquired from any databases of information such as sources of structured or unstructured data that contain location or other information (e.g., Google® Maps, Wikipedia®), or other related services.

Algorithm 100 then provides data set 30', which is laid over image 30 on display 25. Data set 30' can be one or more thumbnail images, one or more pins indicating points of interest, a full, "ghost" image that is overlaid onto image 30, a content module, an entry point to further information, a micro-browser, other content, or any combinations thereof. Data set 30' may also include, for example, what is depicted in image 30, relevant or interesting facts about the object, when an object in image 30 was completed (e.g. date of creation of a work of art, date of construction of a building), how to interact with objects in image 30 (e.g. visiting hours or location for a landmark), the name of the artist or other persons associated with an object in image 30, who in the user's network has engaged with any objects in image 30, similar objects, or other information. If data set 30' does not accurately line up with the real time image 30, algorithm 100 shifts and aligns data set 30' with the real time image 30.

Figure 2:
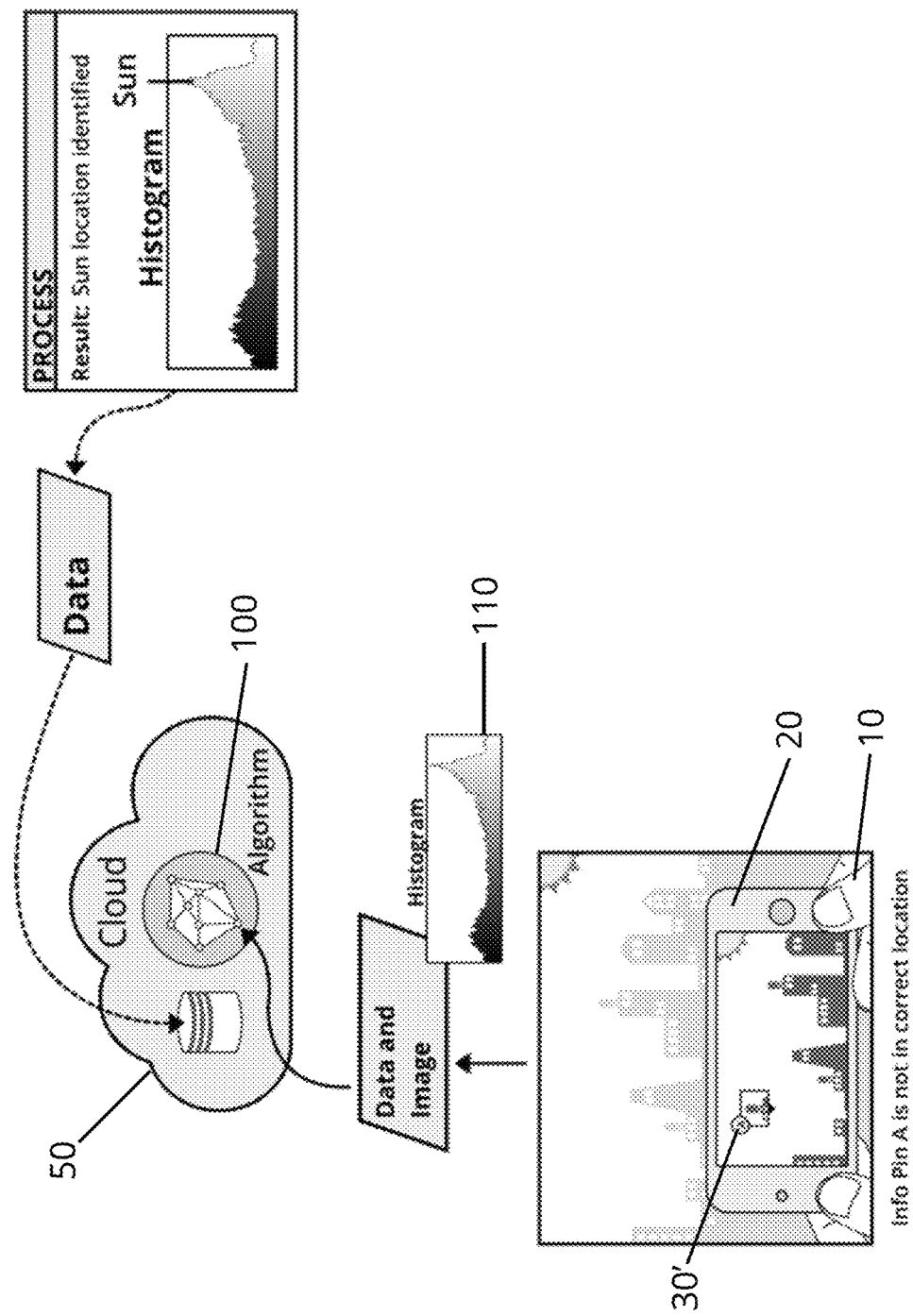

As shown in FIG. 2, algorithm 100 takes image 30, and any data associated therewith, in particular the live image data, the time of day, the compass heading, and the location as determined by a global positioning satellite (GPS). The compass heading provided by device 20 may be inaccurate, but it is expected that the time of day and location are accurate. Algorithm 100 also creates an image histogram 110 that is associated with image 30, based on brightness levels, shadows, and mid-tones for all areas of image 30. Image histogram 110 can be defined as an asymmetric multimodal histogram (one with non-patterned distribution across multiple dimensions). Other histogram types can be utilized as well.

In FIG. 2, algorithm 100 is depicted as residing on a remote server or cloud 50. As previously discussed, algorithm 100 can reside on device 20, within cloud 50, or both. Stated another way, a first portion of algorithm 100 resides on device 20, and a second portion of algorithm 100 resides on a remote server or cloud 50. The division of computing between device 20 and cloud 50 may depend on the relative amount of processing power available on device 20 and in cloud 50. For example, in one embodiment, many of the calculations are conducted on device 20, based on acquired sensor and other local data (device type, user preference, sensor data, offsets, EXIF, etc). The remaining functions of algorithm 100 can be conducted on cloud 50. Here, within cloud 50, algorithm 100 can contain or have access to inference models and historical trending and future prediction (e.g., the identification of a tree growing, building under construction). The portion of algorithm 100 on cloud 50 builds a confidence over time as to what an object is, and can also prompt user 10 for confirmation and more information. Also, the portion of algorithm 100 on cloud 50 can deliver local weather conditions, time of day and an aggregate of what other users 10 have reported. Currently available devices 20 (e.g. tablets, mobile phones) may not have the processing power to collect this much information. However, as mobile devices become more powerful, the present disclosure contemplates that an increasing number of the functions performed by algorithm 100 could be performed locally on device 20.

For a known location and time of day, it is known exactly where the sun would exist in the sky, for example through available astronomical data sources. Algorithm 100 can access this information. From image 30, along with the other data, algorithm 100 analyzes image histogram 110 to determine the perspective of device 20 relative to the sun in the image 30. Since the sun would be at a known location and angle from the horizon and that the time of day and location are being reported accurately, then it is simple to calculate the angle and perspective of the device. The sun is shown as an example, but the present disclosure also contemplates that other sources of light could be used, such as the moon or artificial light sources.

In one example, as shown in FIG. 2, algorithm 100 concludes that the sun in image 30 is ten degrees below the horizon from where it should be and that the device's compass sensor is off by plus-ten degrees. The device data accessed by algorithm 100, in one example, provides the location of device 20 (from GPS) along with the exact time, and additional heading data from the compass. One example of the data format could be as: 40.75,−73.9893,12/2015.04.07/14:05 378' N. By establishing the device's precise time and location from the GPS sensor and heading data from the compass sensor, and using image histogram 110, algorithm 100 then analyzes image 30 to determine where the brightest portion of image 30 (in this case the sun) appears on display 25. By calculating the difference in expected location versus reported location, any offset between the location of data set 30' and where it should be on image 30 can be calculated. Algorithm 100 provides these offsets back to device 20 and, when the corrected values are incorporated, user 10 and their device 20 are presented with the correct representation of data set 30' as overlaid onto image 30. FIG. 3a shows an improperly located data set 30', and FIG. 3b shows how data set 30' is properly located by algorithm 100. Importantly, and in contrast to some currently available devices and methods, the user 10 does not have to manipulate the real time image 30 or data set 30' in any way.

The corresponding offset or shift established by this calibration could then modify heading and perspective (angle relative to known objects or horizon) as provided by the device's sensors. These offset values could then be stored, either locally on device 20 or remotely, for ongoing use by device 20 and related applications.

The example shown in FIG. 2 and described above uses the location of the sun to determine the required offset for data set 30'. However, the present disclosure contemplates that other reference points may be used to calculate offsets, such as but not limited to historical trends, weather, shadows, or other known or unknown obstructions As used in the present disclosure, the term "device" may refer to a mobile phone, a tablet, or any other digital device capable of acquiring an image and input/output communication. In the Figures, for convenience, device 20 is shown as a mobile phone. As previously discussed, algorithm 100 may reside on device 20, be located remotely on a server or cloud 50, with which device 20 would communicate, or both.

Figure 5A:
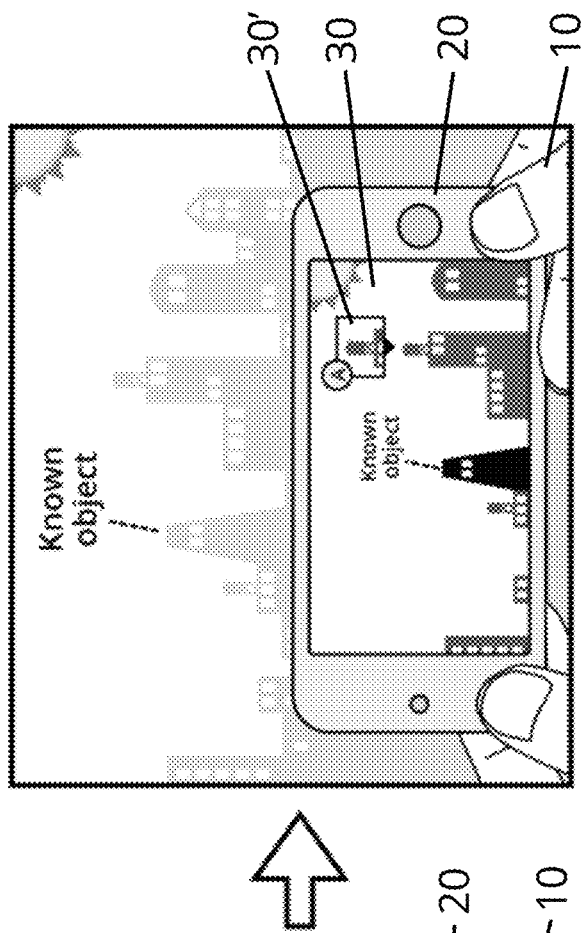
Figure 5B:
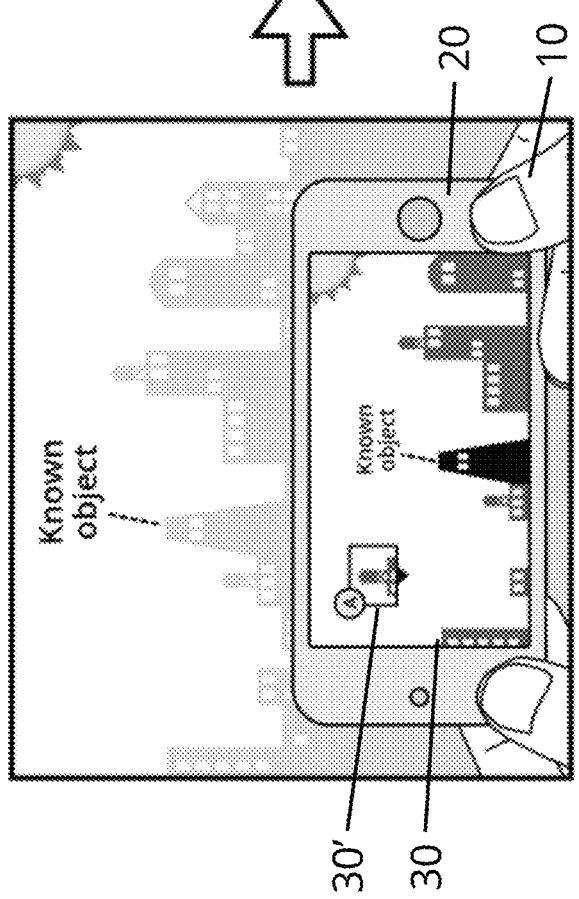

Referring to FIGS. 4-5b, algorithm 100 can also determine the proper offset and location of data set 30' based on the location of known objects. As previously discussed, algorithm 100 can collect sensor data from device 20, which could include but is not limited to GPS location, heading, time of day, and camera sensor data. Algorithm 100 then utilizes histogram analysis to identify an object 132 of known location (e.g., a landmark or geographic feature) within image 30. Under this type of histogram analysis, which is not necessarily based on the brightness of the image or location of the sun, algorithm 100 can identify object 132 by analysis of individual pixels and/or an area of image 30. Additionally, algorithm 100 can identify object 132 with color identification (e.g., green is more likely to be a tree, and blue might be the sky).

Algorithm 100 can then calculate and apply a calibration offset in the device to accurately represent the heading and perspective/angle of device 20, and place the data set 30' in its proper location. FIG. 5a shows an image where data set 30' is located incorrectly, where in FIG. 5b, after the offset is applied, data set 30' is laid in the correct location within image 30. Again, once all data has been analyzed by the algorithm 100, the new offset values could be stored, either locally on device 20, or remotely.

Figure 6:
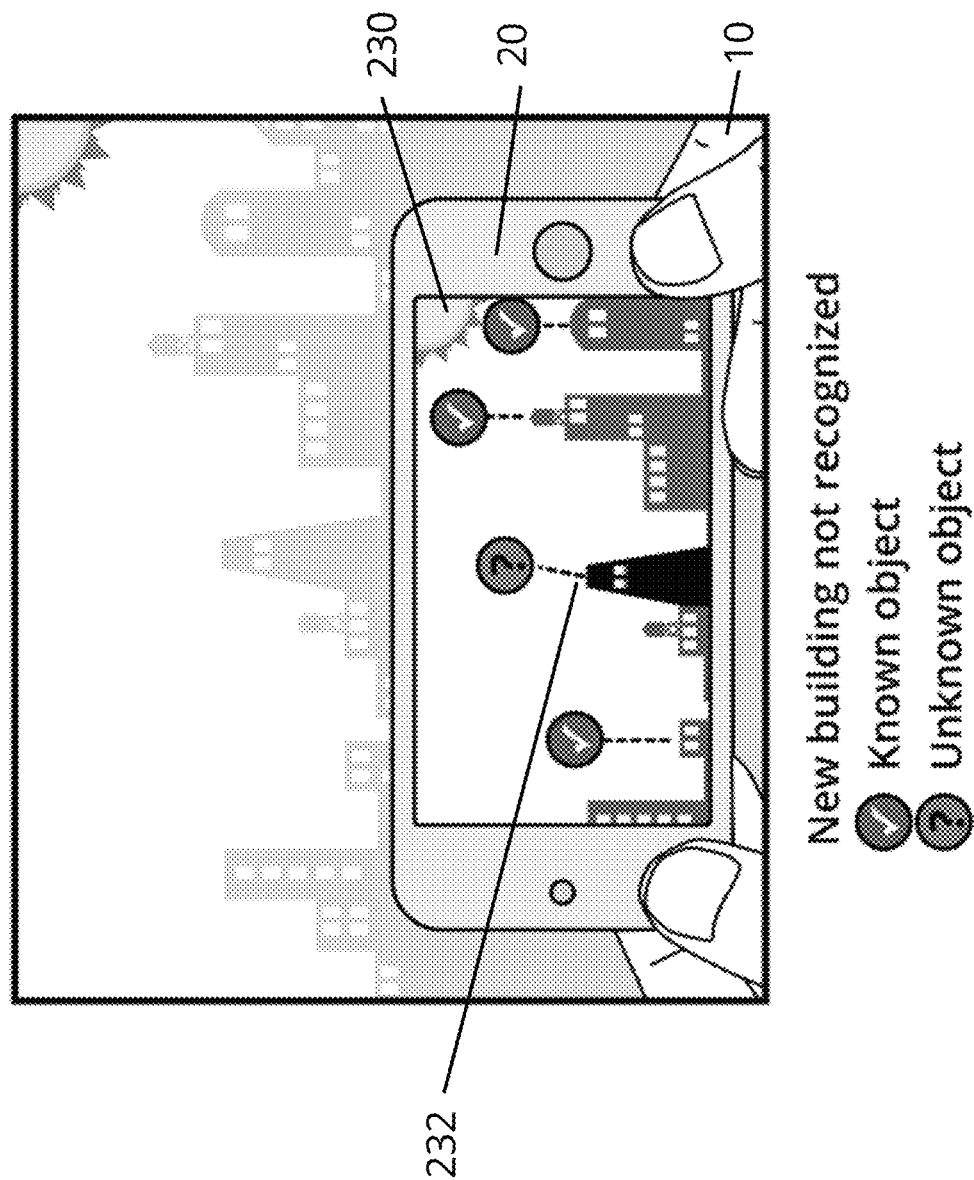
FIGS. 6-8 are schematic drawings depicting a third application for an algorithm of the present disclosure.
Figure 7:
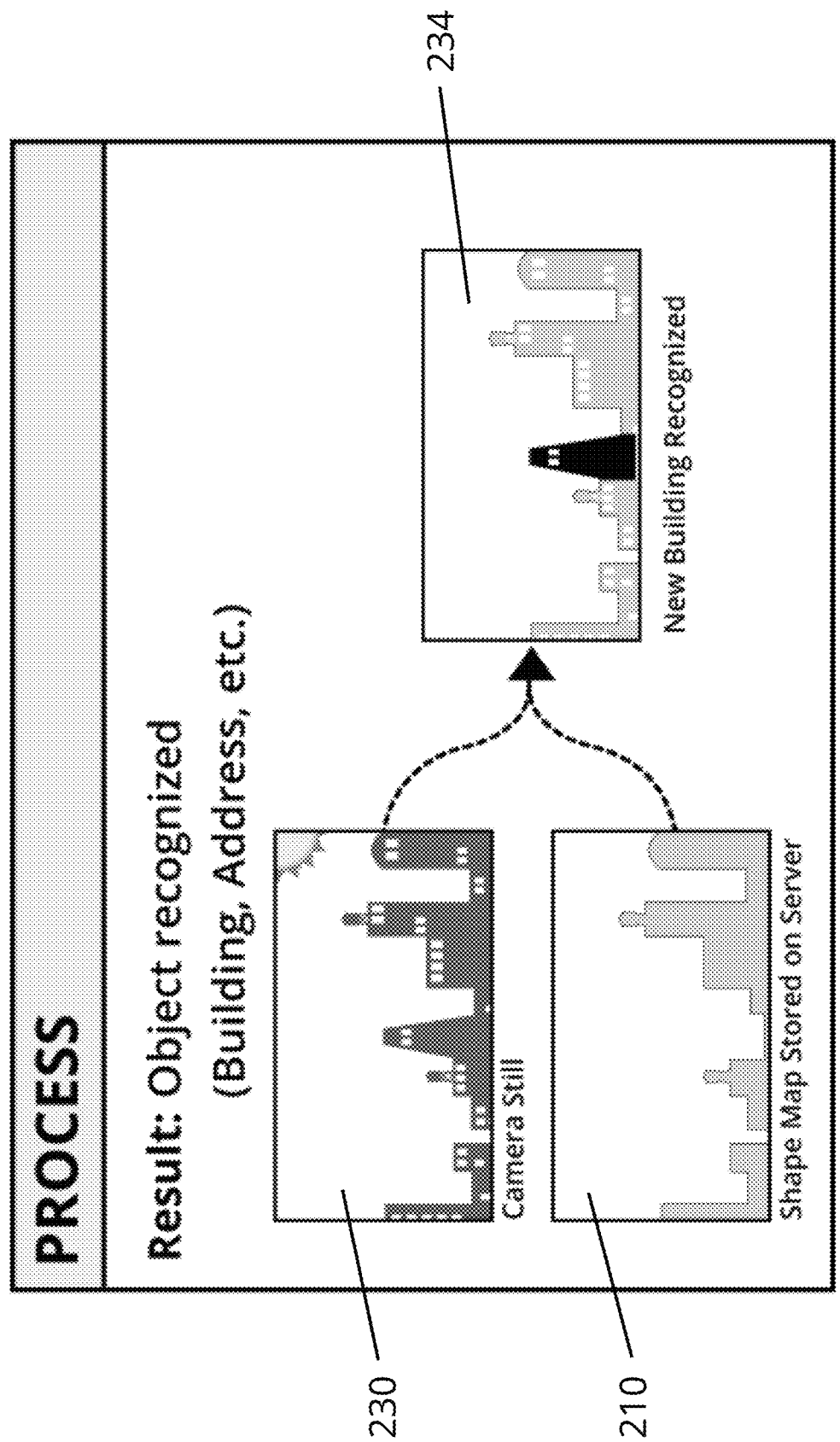
Figure 8:
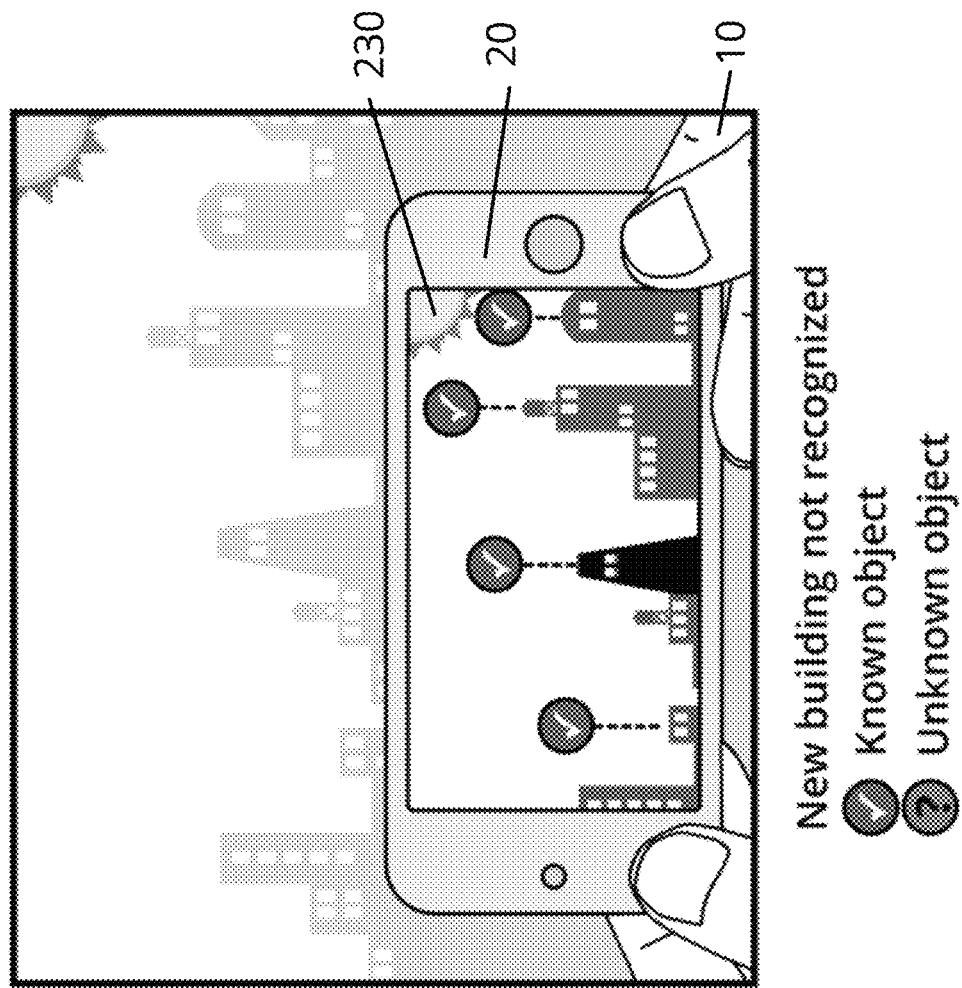

Referring to FIGS. 6-8, algorithm 100 also provides the ability to detect objects or obstacles that are not of known location. Similarly to the methods described above, algorithm 100 can analyze data provided by device 20, including but not limited to an image histogram, GPS location, heading, time of day, or camera sensor data. Algorithm 100 can identify the placement of an object 232 that lacks a known location within a real-time image 230. The location of unknown object 232 can be stored for future use. This use of algorithm 100 is particularly well-suited for identifying unknown objects such as trees, buildings, etc. or transient objects that don't remain stationary or change shape and size over time. In this embodiment of the invention, algorithm 100 compares an expected image histogram or shape map 210 with real-time image 230, to provide a comparative result 234 that identifies the object 232 of unknown location. The expected image or shape map 210 can be prepared locally on device 20, by taking a snapshot and combining it with EXIF data from the camera sensor. Histograms sent to the cloud 50 from other users would be leveraged for building trends, confidence and algorithmic pattern matching. Using the same methods, the solution provided by this invention would also have the ability to detect moving or transient objects and provide the ability to filter them out of the results set or data processed by algorithm 100.

In addition to the offset being provided by the solution covered under the invention here, in another embodiment, algorithm 100 allows user 10 to tag or label objects or obstacles detected by algorithm 100 but previously unknown. In the example depicted in FIGS. 6-8, user 10 could tag unknown object 232 with a label such as "building" or "skyscraper". The label or tag that is provided by user 10 could be information about what the object is (e.g., but not limited to, structure, building, tree, stationary, movable, temporary, great place to eat, somewhere to come visit). This label or tag could then be stored by algorithm 100 and retrieved by device 20 and related applications for future use and interaction with user 10, or other users 10, as discussed in greater detail below.

Figure 9:
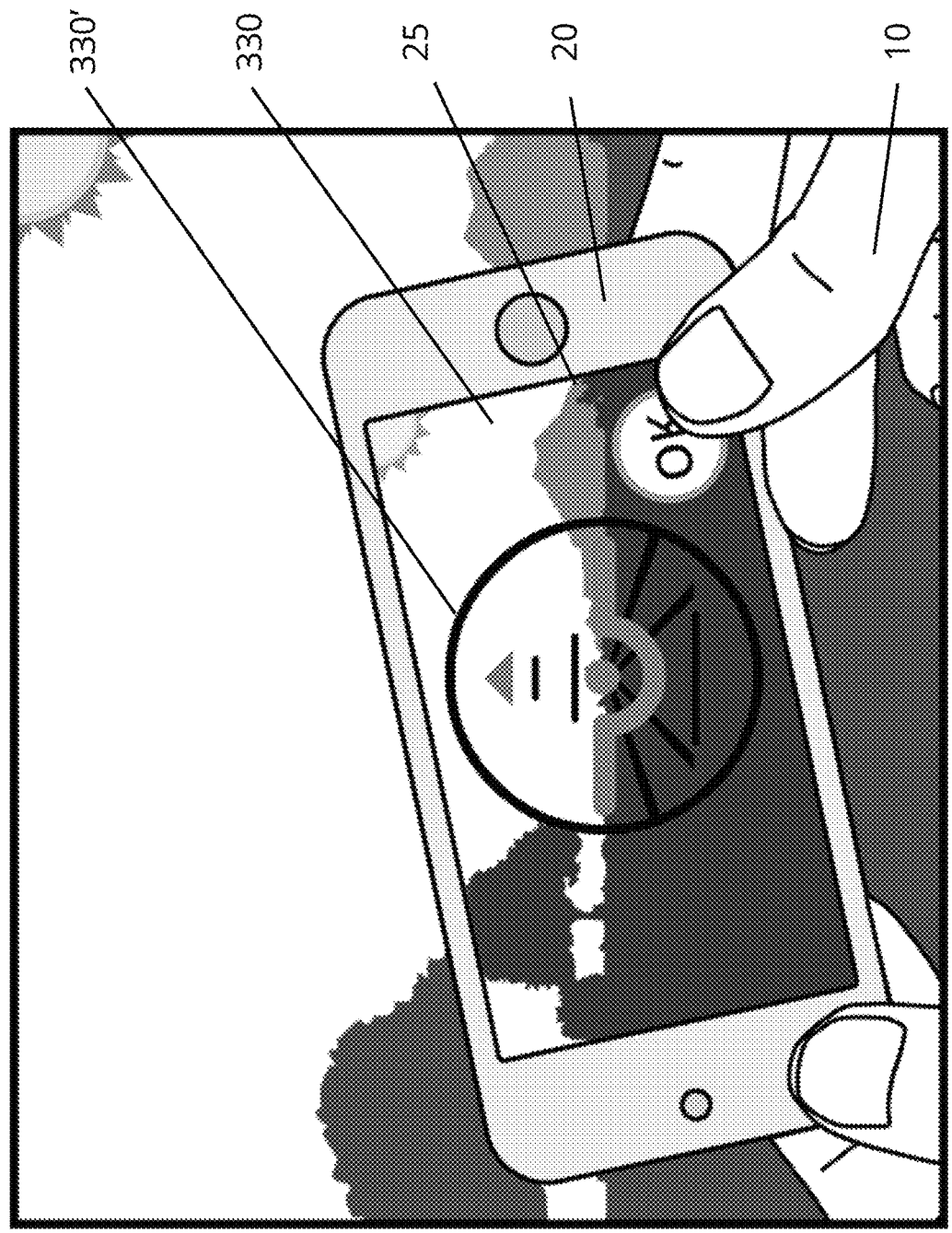
FIGS. 9-10 are schematic drawings depicting a fourth application for an algorithm of the present disclosure.
Figure 10:
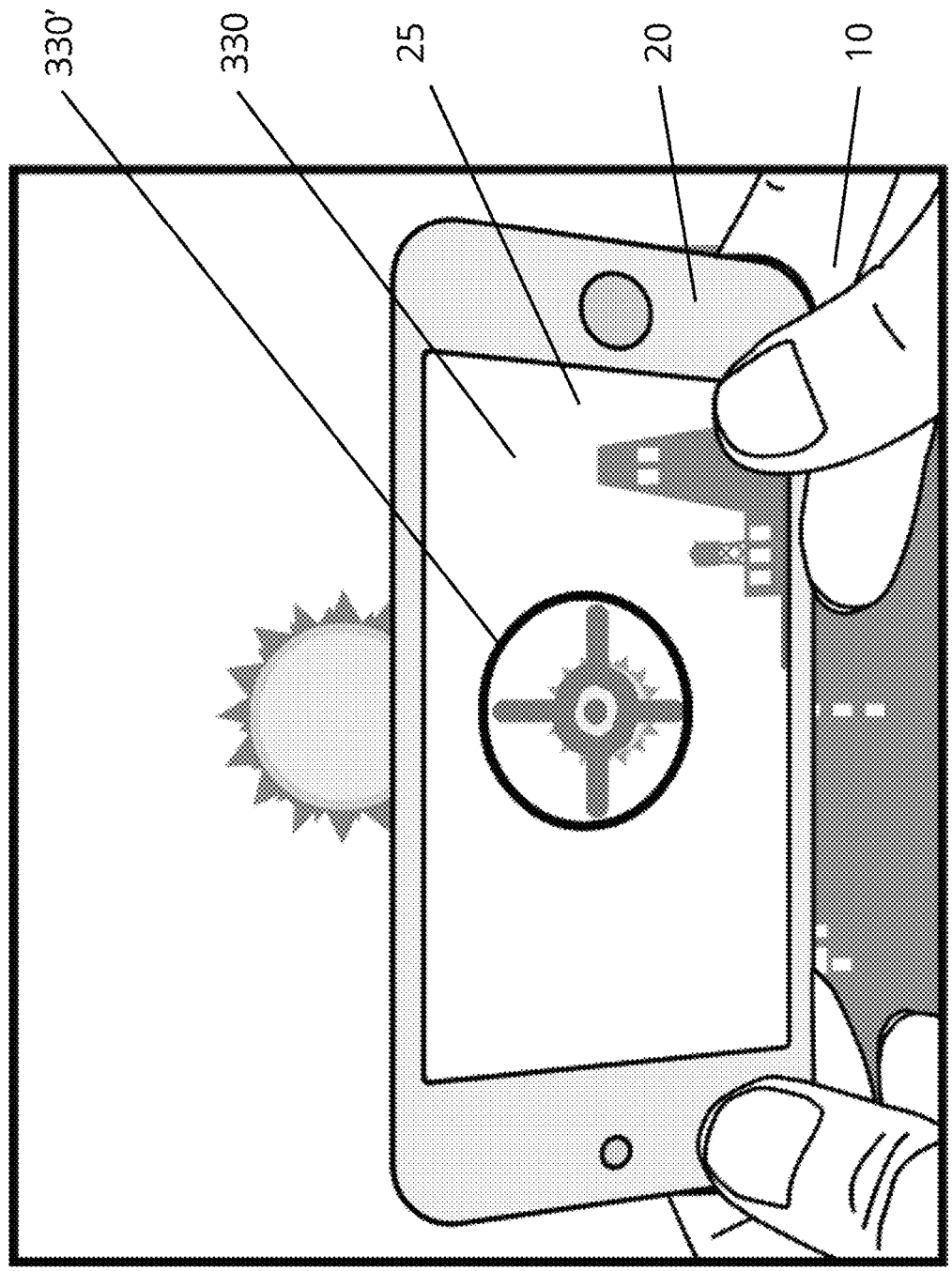

Referring to FIGS. 9-10, another use of algorithm 100 is shown. As shown, algorithm 100 could send an overlaid representation 330' of the horizon and/or place an overlay of the sun on the display 25 of device 20. User 10 can then manipulate device 20 and display 25 so that the image 330 of the sun and horizon on display 25 match the overlay. Once overlay 330' and image 330 are aligned, user 10 would have the option to "select" the new settings. Similarly to what is described above, these settings could be stored either on device 20 or remotely.

As previously discussed, algorithm 100 can reside on a local device 20, and perform the necessary data collection, image acquisition, and overlay locally on device 20. The present disclosure also contemplates and provides the ability for individual calibration offset data to be passed over a network at any configurable interval to a centralized algorithm 100 which would analyze and compute the aggregation of offset data for all connected devices using algorithm 100. This algorithmic computation could then be sent back to connected devices to improve the perception accuracy of sensor-output data for all devices and sensors or provide other object content or information provided by the invention and collection of connected devices. FIGS. 11-18 show several embodiments of this process. Stated another way, in the embodiments shown in FIGS. 11-18, some of the offset calculations relating to data set 30' are calculated locally on device 20. These calculations are then reported to cloud 50. Algorithm 100 can receive data from one or more other users 20 that are also reporting to cloud 50. Algorithm can then collate all of this offset data, and sent improved offset data to each individual device 20 as needed.

Figure 11:
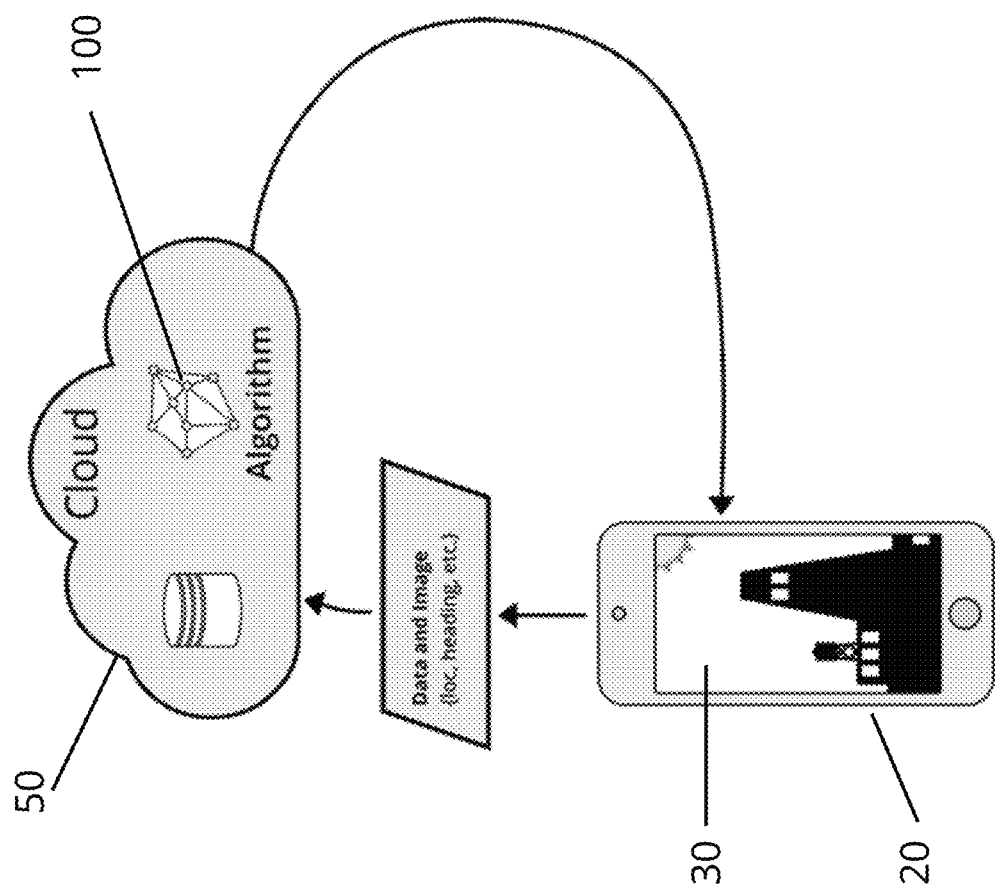
FIG. 11 is a schematic drawing depicting a fifth application for an algorithm of the present disclosure.

FIG. 11 shows one embodiment where algorithm 100 is based on a cloud or remote server. The same methods detailed above for a single device 20 would be employed. However, in the embodiment shown in FIG. 9, device 20 acquires the relevant image and location data. This data is sent to algorithm 100, as before, but in this embodiment algorithm 100 resides on cloud 50. Other than this difference, the process is the same. Algorithm 100 computes the required offsets, and sends data (such as data set 30') back to device 20. As discussed in detail below, device 20 can be one or more devices 20.

Figure 12:
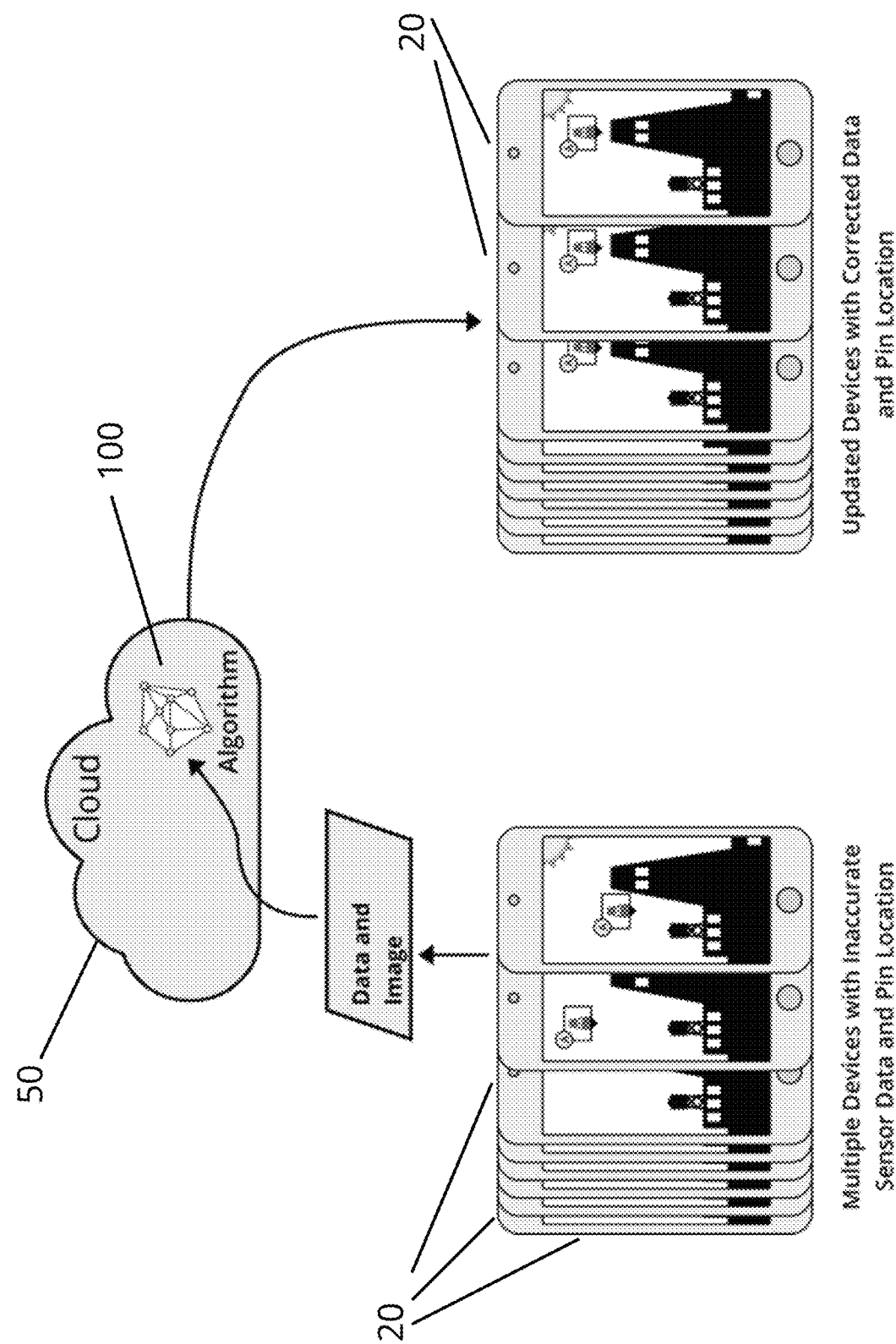
FIG. 12 is a schematic drawing depicting a sixth application for an algorithm of the present disclosure.

In another embodiment of the disclosure, shown in FIG. 12, the locally derived device-specific sensor data and offset data provided by this invention would be passed to a remote server or cloud 50. A plurality of devices 20 are in communication with cloud 50 and algorithm 100. In cloud 50, algorithm 100 could combine the data of all connected devices 20. The offset data, along with sensor and other data including but not limited to, time of day, location, user name, device type, device version application ID, application version, operating system, type and version, etc. would be analyzed by algorithm 100. Algorithm 100 could then determine which calibration or other data would need to be transmitted back to all connected devices 20 selected based on service logic.

Figure 13:
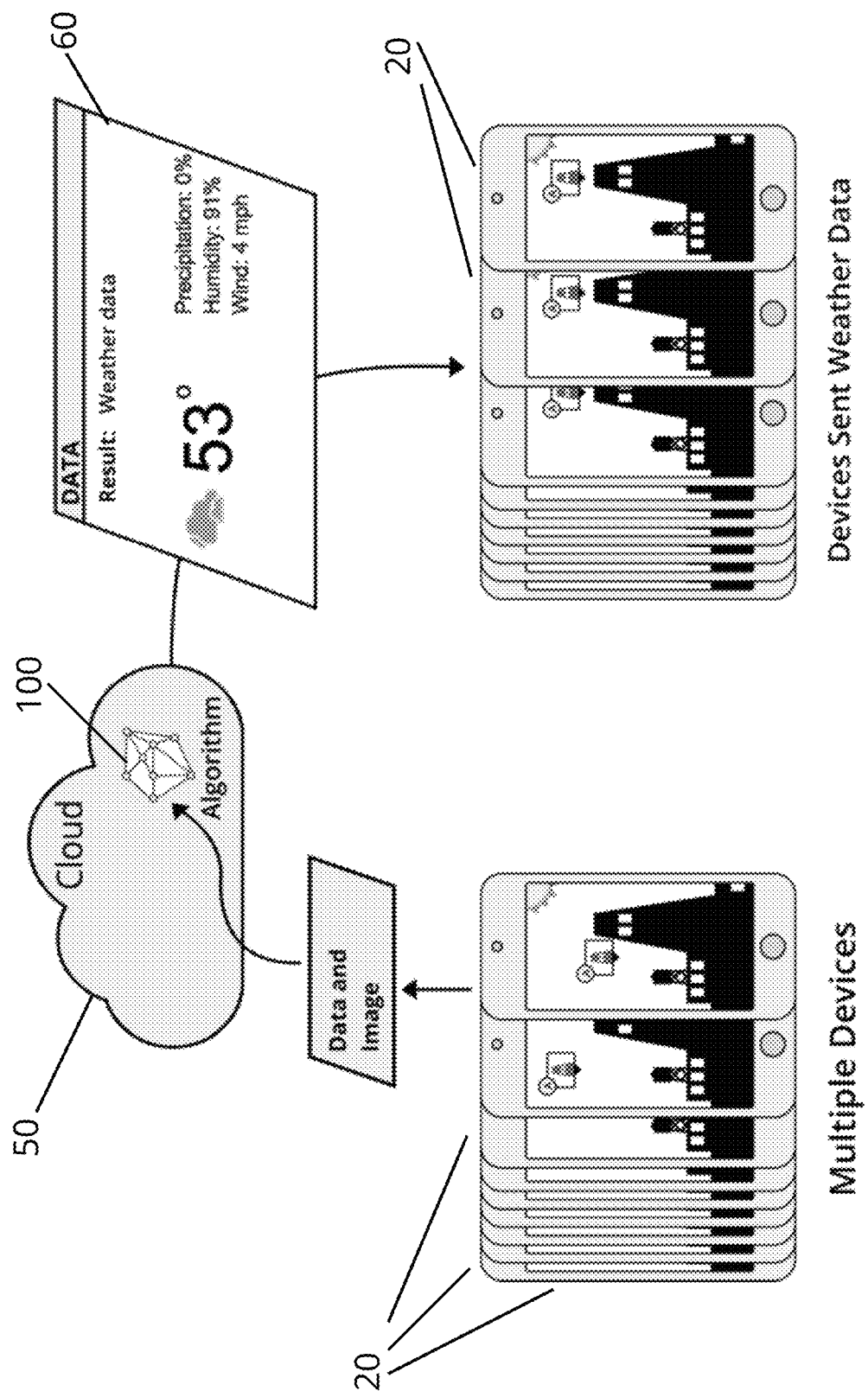
FIG. 13 is a schematic drawing depicting a seventh application for an algorithm of the present disclosure.

In another embodiment of this invention, shown in FIG. 13, the locally derived device-specific sensor data and offset data provided by this invention would be passed to cloud 50, as before. Then, algorithm 100 could combine this data with weather data 60 provided by a separate service. In conjunction with the data analysis conducted by algorithm 100 as described above, including histogram and sensor data analysis, the weather data would be used by the cloud 50 to more accurately provide offset results. Based on the logic provided by the cloud 50, the brightest location in an image (along with other sensor data) could be updated and passed back to the individual devices 20 based on current weather conditions. This would account, for example, for cloudy or overcast days when a clear image of the sun cannot be obtained.

Figure 14:
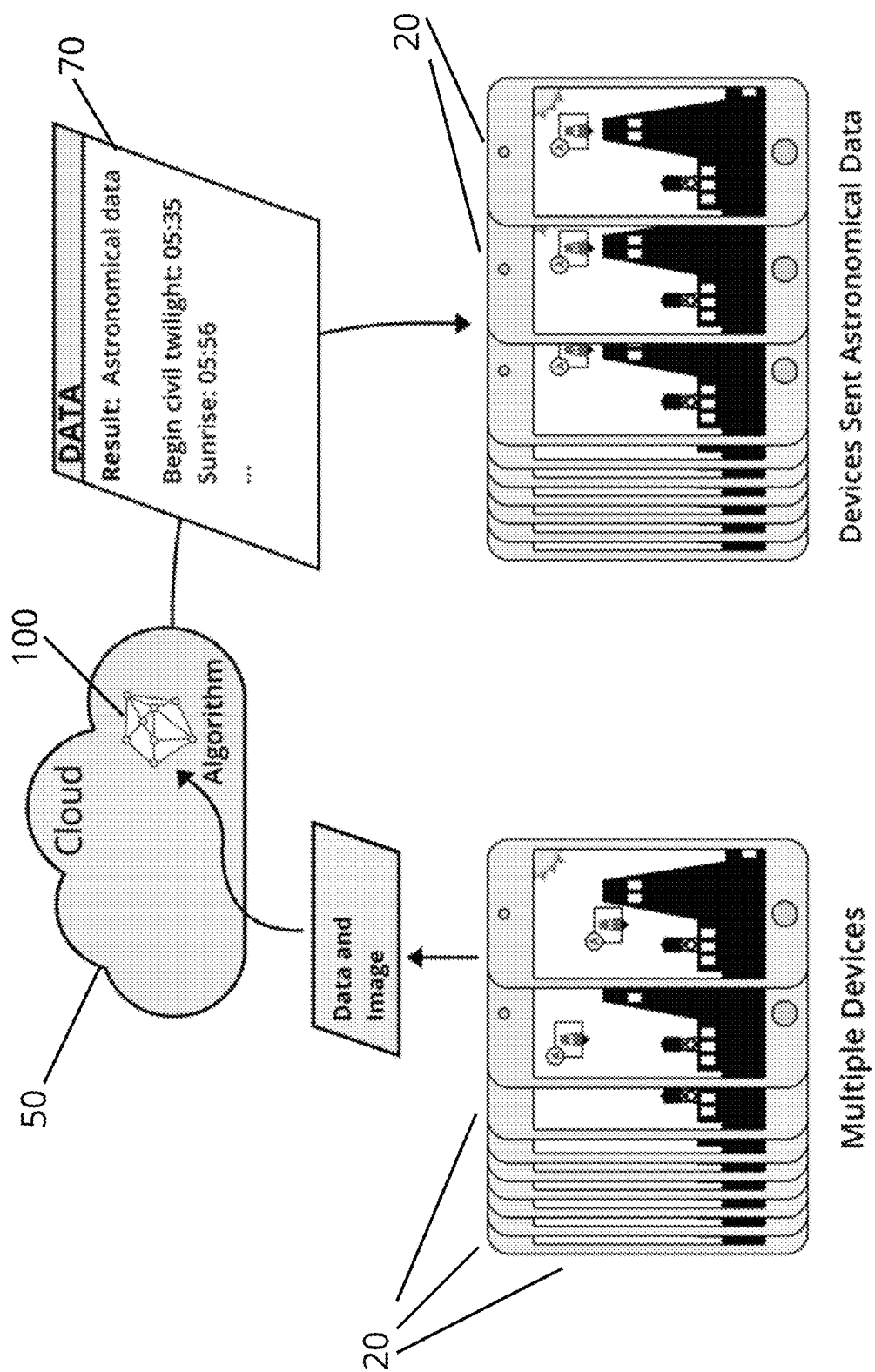
FIG. 14 is a schematic drawing depicting an eighth application for an algorithm of the present disclosure.

In another embodiment of the disclosure, shown in FIG. 14, the locally derived device-specific sensor data and offset data provided by this invention would be passed to cloud 50. There, algorithm 100 could combine the data of all connected devices 20 with astronomical data 70 provided by a service. In conjunction with local analysis, including histogram and sensor data analysis described above, the astronomical data 70 would be used by cloud 50 to more accurately provide offset results based on locally-computed positional and perspective accuracy calculated in conjunction with camera sensor or histogram analysis using known location of the sun, moon or other cataloged celestial objects (may be sourced from the Messier database, the New General Catalog, etc.). Based on the logic provided by algorithm 100, the brightest location in an image (along with other sensor data) could be updated and passed back to the individual devices based on known astronomical data 70, including but not limited to location of the sun, location of the moon, sun/moon rise, sun/moon set, arc angle or other data. Algorithm 100 will also filter out anomalous results provided by the device and image and histogram analysis to account for bright lights, shadows or other objects in the field of view that are not known to be one of the astronomical elements and their corresponding information as provided by the service. The embodiment of FIG. 14 thus differs than those described above in that the embodiment of FIG. 14 enhances the analysis conducted locally on device 20 with the known position of celestial or astronomical objects. As the location of device 20 is known, the astronomical data 70 can provide an even greater level of detail and accuracy when determining the proper position of data set 30'.

Figure 15:
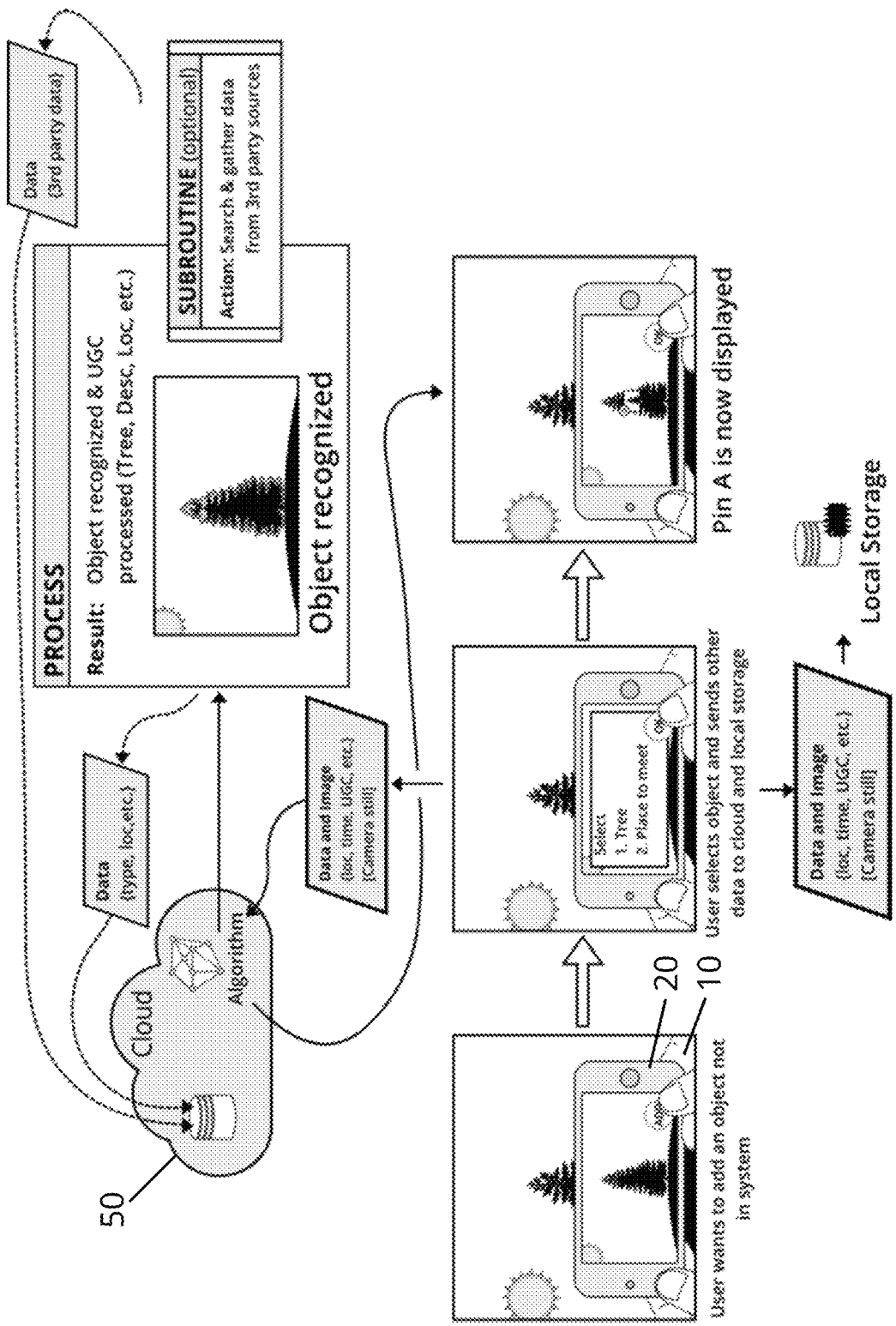
FIGS. 15 and 16 are schematic drawings depicting a ninth application for an algorithm of the present disclosure.
Figure 16:
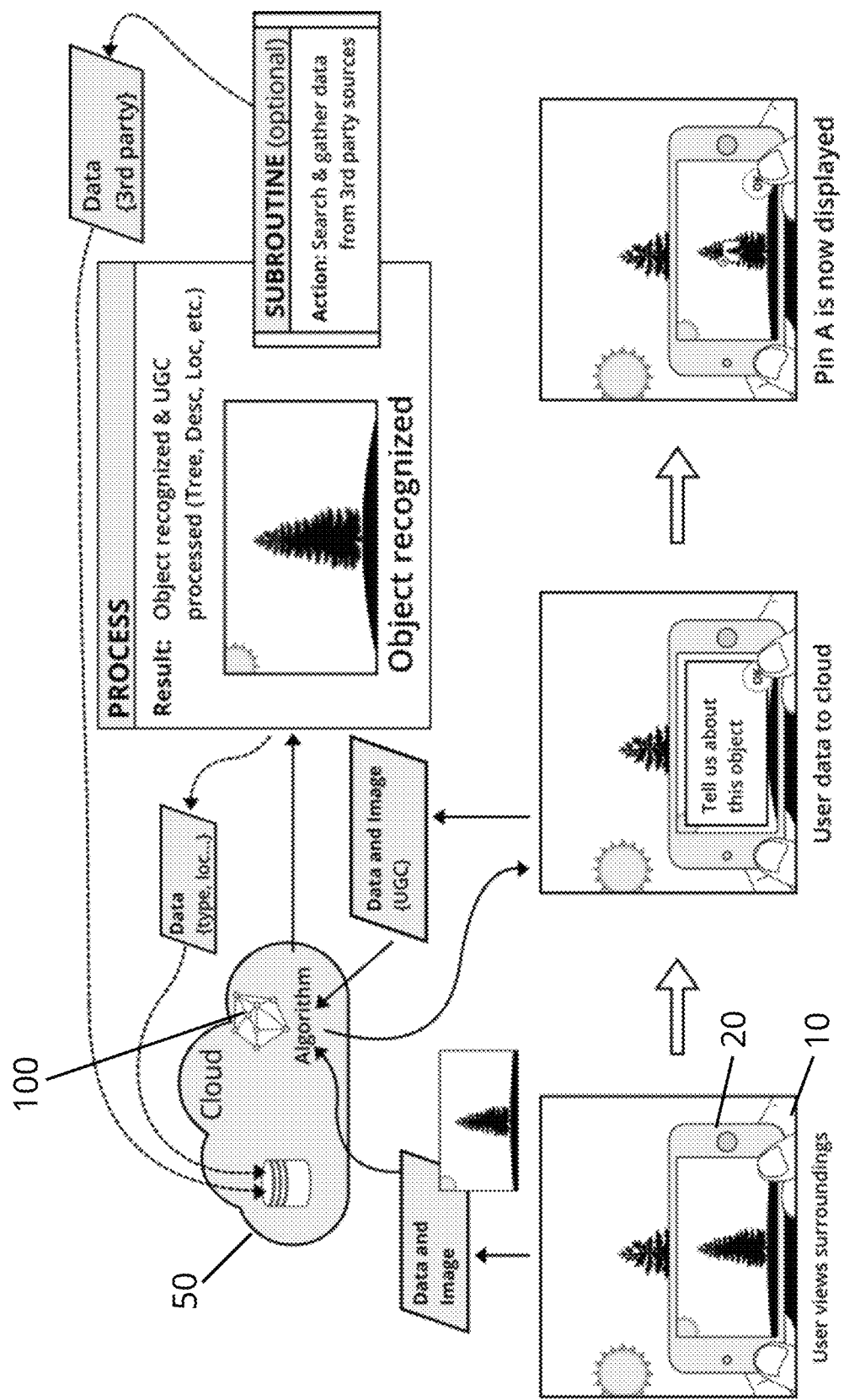

In another embodiment of the disclosure, user 10 would have the ability to label objects of known or unknown location to the system or device. This feature was also previously discussed with respect to FIGS. 4-8. The process of labeling could be user-initiated, as depicted in FIG. 15, or system-initiated, as shown in FIG. 16. Algorithm 100 would compute a confidence of user-provided results to determine the accuracy of community-provided labels. As the examples in FIGS. 15 and 16 illustrate, the system would have a high confidence in label accuracy if a plurality of users label an unknown object as "tree". By contrast, if a minority of users label the object as "great place for a picnic", the latter result may still be statistically relevant but have a lower confidence score than the former.

Figure 17:
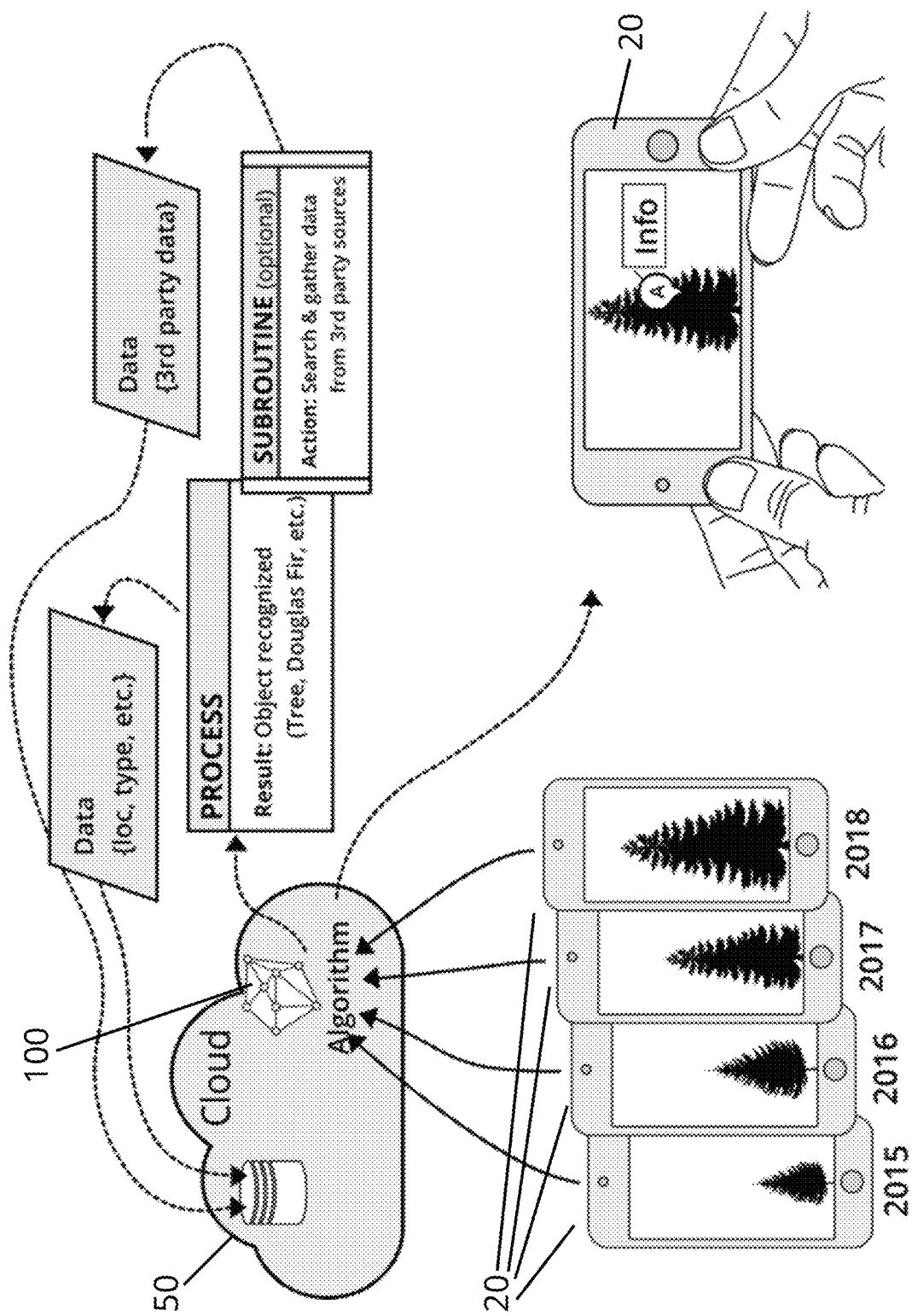
FIGS. 17 and 18 are schematic drawings depicting a tenth application for an algorithm of the present disclosure.
Figure 18:
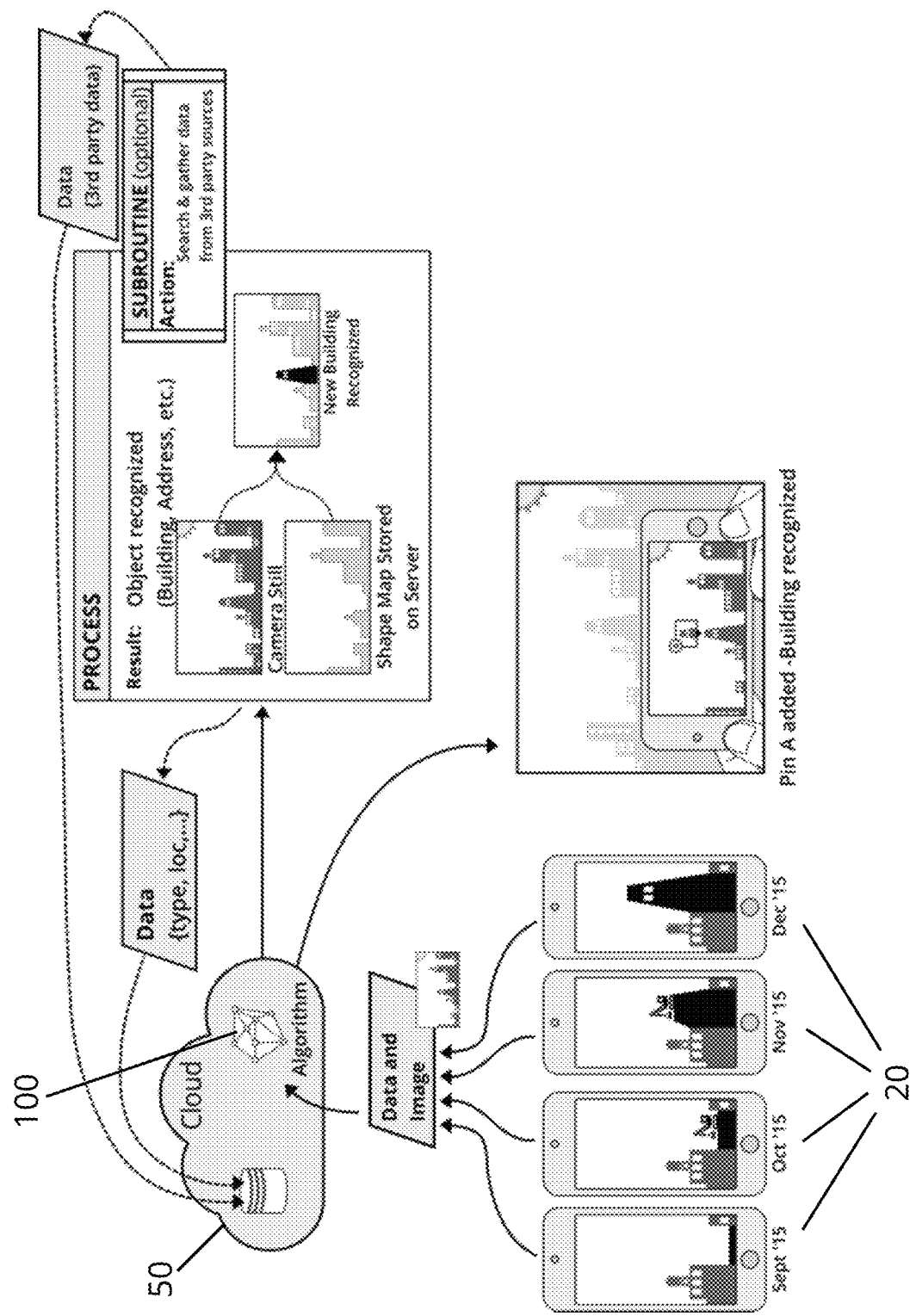

In another embodiment of this invention, as shown in FIGS. 17 and 18, cloud 50 and algorithm 100 have the ability to retain and store all histogram, image and other sensor data, and analyze them over time for both known and unknown objects and then apply historical and future trend analyses and results. An example of how this would be useful would be for identifying the growth of a tree, or the construction of a building, as seen in FIGS. 17 and 18 respectively. In the former, algorithm 100 would evaluate the history of all images and associated sensor data provided by a community of users 10 and their respective devices 20 over a relatively long timeframe. FIG. 18 shows the identification of a building under construction over a relatively shorter time frame. The interval and corresponding historical trends are some of the many methods algorithm 100 would employ to classify unknown objects that recur over time. In addition to calculating a high-confidence score, the solution also enables cross labeling to fill in additional data about an object. An example of how this is done, but no limited to, is that for those objects that are classified (with high confidence) as being a "building" the system would append the data in the system to also label the object with additional data that could be both provided by the users or by the system. In this example, a building might also carry the labels: stationary, 118' tall, permanent, residential, brick, etc.

While the present disclosure has been described with reference to one or more particular embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this disclosure.

What is claimed is:

1. A system for acquiring an image and overlaying a data set on the image, the system comprising:
   a user device, the user device comprising an image acquisition sensor, a display, and communication port;
   a server, wherein said server communicates with said user device via said communication port; and
   an algorithm comprising a first portion and a second portion, wherein said first portion is resident on said user device and said second portion is resident on said server,
   wherein said image acquisition sensor acquires the image and displays said image on said display,
   wherein said algorithm acquires the image from said image acquisition sensor, determines the nature of an object in the image, and supplies the data set at a location in the display, wherein the data set contains information relating to said object,
   wherein the data set comprises information pertaining to the object in the image, and
   wherein said algorithm determines if said location of the data set aligns with the location of said object, and if not, automatically calculates and applies an offset to the data set, so that the data set aligns with said object in said image.

2. The system of claim 1, wherein said user device further comprises at least one of a location sensor, a compass, and a time source, that provide a location of said user device, a heading of said user device, and a time, respectively.

3. The system of claim 2, wherein said algorithm receives at least one of said location, said heading, and said time from said user device.

4. The system of claim 3, wherein said algorithm determines said location of said data set based on at least one of said location, said heading, and said time from said user device.

5. The system of claim 1, wherein said first portion of said algorithm determines said offset.

6. The system of claim 1, wherein said second portion obtains said information in said data set from a remote source of structured or unstructured data.

7. The system of claim 1, wherein said algorithm creates an image histogram based on a brightness of said image, and determines said location of said data set and said offset based at least in part on said image histogram.

8. The system of claim 1, wherein said user device is a plurality of user devices, each of which is in communication with said server.

9. The system of claim 8, wherein said second portion of said algorithm obtains said location and offset from each of said plurality of user devices.

10. The system of claim 9, wherein said second portion of said algorithm analyzes said location and offset from each of said plurality of user devices, and transmits adjusted location and offset data to each of said user devices based on said analysis.

11. The system of claim 9, wherein said second portion of said algorithm acquires weather data from a weather database, and combines said weather data with said location and offset data to determine said adjusted location and offset data.

12. The system of claim 9, wherein said second portion of said algorithm acquires astronomical data from an astronomical database, and combines said astronomical data with said location and offset data to determine said adjusted location and offset data.

13. The system of claim 8, wherein said algorithm prompts a user of each of said plurality of devices to name an unidentified object within said image.

14. The system of claim 13, wherein said second portion of said algorithm stores said name supplied by each of said users, and analyzes said names supplied by said users for statistical relevance.

15. The system of claim 8, wherein said second portion of said algorithm obtains data said plurality of user devices regarding an unknown object, and tracks historical trends relating to said unknown object over a period of time.

16. The system of claim 1, wherein said algorithm acquires at least one of a time of day and weather conditions from a remote source, and determines said location of said data set based on at least one of said time of day and said weather conditions.

* * * * *